Figures 7, 8:
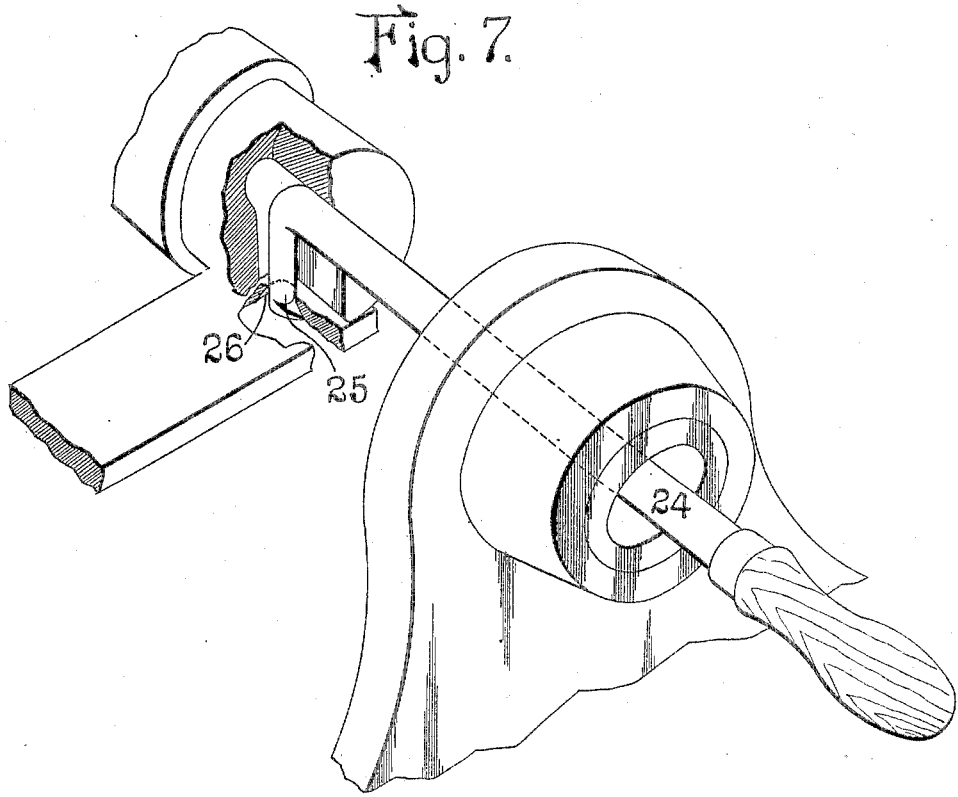

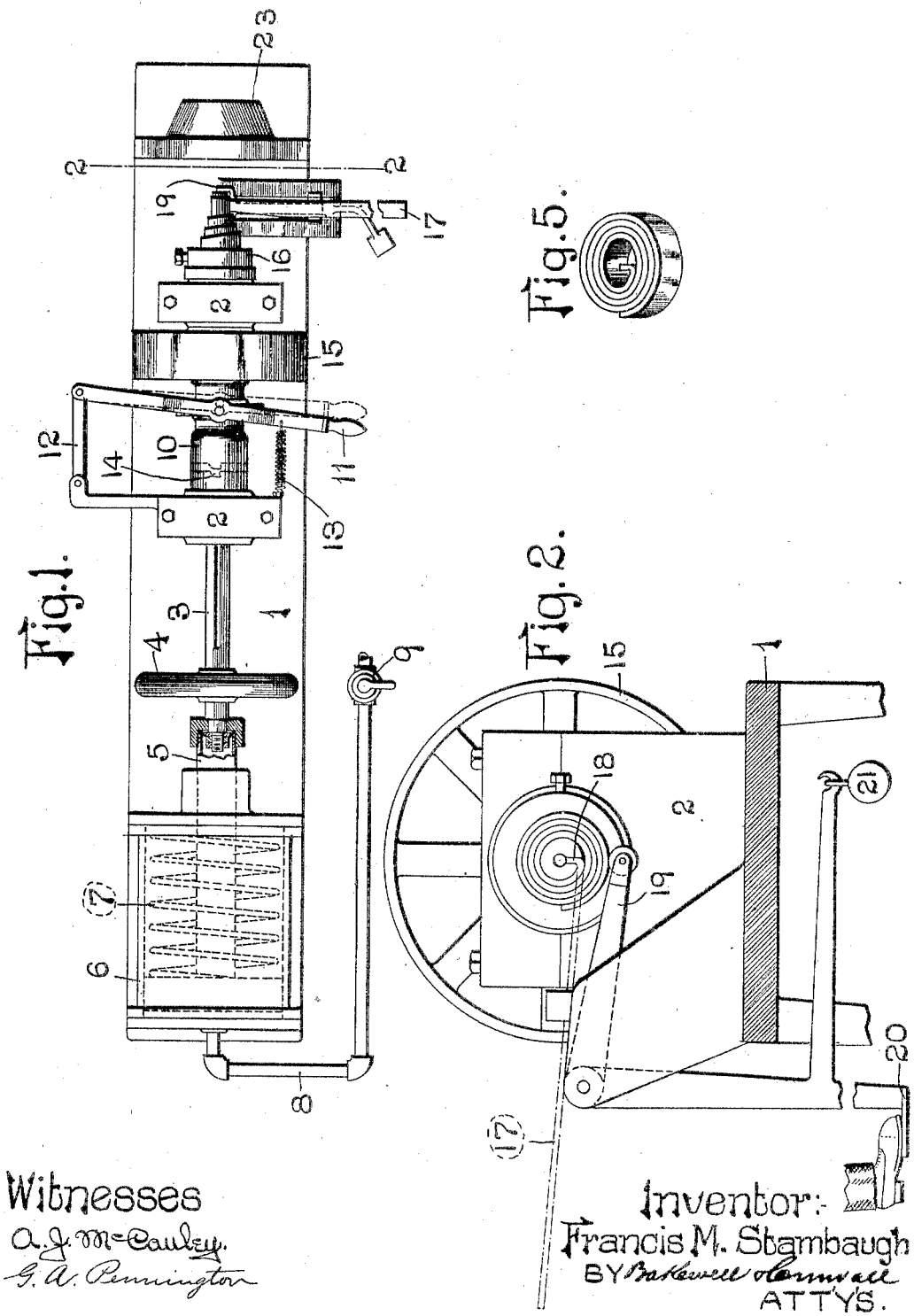

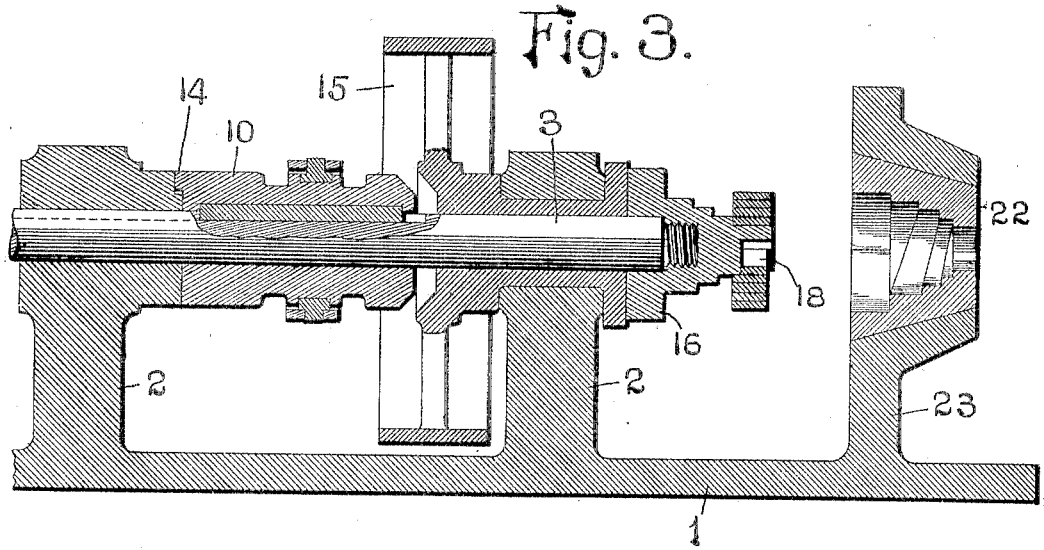
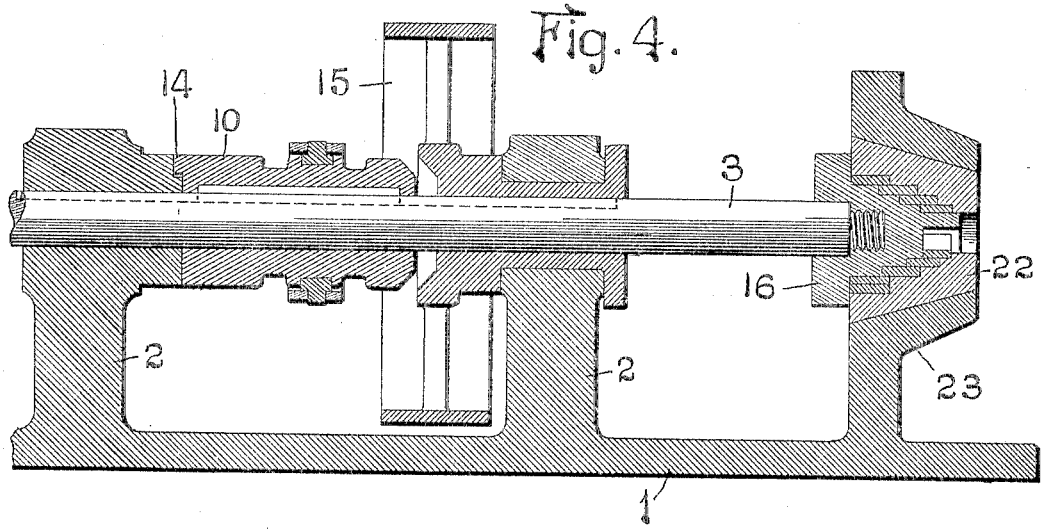
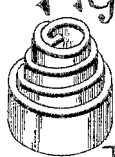

No. 797,331. PATENTED AUG. 15, 1905.
F. M. STAMBAUGH.
MACHINE FOR MAKING HELICAL SPRINGS.
APPLICATION FILED MAR. 7, 1905.

3 SHEETS—SHEET 3.

Witnesses
U. J. McCauley.
G. A. Pennington.

Inventor:-
Francis M. Stambaugh
BY Bakewell & Cornwall
ATTY'S.

UNITED STATES PATENT OFFICE.

FRANCIS M. STAMBAUGH, OF ST. LOUIS, MISSOURI, ASSIGNOR TO THE AMERICAN BRAKE COMPANY, OF ST. LOUIS, MISSOURI, A CORPORATION OF MISSOURI.

MACHINE FOR MAKING HELICAL SPRINGS.

No. 797,331.     Specification of Letters Patent.     Patented Aug. 15, 1905.

Application filed March 7, 1905. Serial No. 248,853.

*To all whom it may concern:*

Be it known that I, FRANCIS M. STAMBAUGH, a citizen of the United States, residing at St. Louis, Missouri, have invented a certain new and useful Improvement in Machines for Making Helical Springs, of which the following is a full, clear, and exact description, such as will enable others skilled in the art to which it appertains to make and use the same, reference being had to the accompanying drawings, forming part of this specification, in which—

Figure 1 is a top plan view of my improved machine. Fig. 2 is an enlarged cross-sectional view on the line 2 2 of Fig. 1. Fig. 3 is an enlarged vertical sectional view showing the parts in one position. Fig. 4 is a similar view showing the parts in another position. Fig. 5 is a detail view of the spring-blank as it is initially formed. Fig. 6 is a detail view of the spring as it is finally formed. Fig. 7 is a modified form of mandrel showing a separable retaining device for the spring-blank, which is also useful in removing the finished spring from the mandrel; and Fig. 8 is a cross-sectional view through the mandrel, showing said modification.

This invention relates to a new and useful improvement in machines for making helical springs designed particularly for use in connection with air-brake couplings, the object being to form said springs of uniform shape to insure the end convolutions occupying parallel planes to provide seats of uniform bearing area on all sides of the spring. Heretofore springs of this character have been formed so as to impart to the helices thereof a uniform pitch after which the top and bottom convolutions were hammered into shape by hand, with the result that the springs did not have uniform top and bottom bearing-faces, and consequently they would not set right in their seats.

My present invention consists in the mechanism hereinafter described for forming helical springs possessing the advantages of uniformity and other advantages set forth above; and it consists in the construction, arrangement, and combination of the several parts, all as will be hereinafter described and afterward pointed out in the claims.

In the drawings, 1 indicates a bed-plate in the form of a table mounted upon suitable supporting-legs and from which rise pedestal-bearings 2. 3 indicates a shaft mounted in these bearings, which shaft at its rear end carries a hand-wheel 4 and is coupled to a piston-rod 5 in such manner that the shaft can rotate independently of the piston; but when said piston is reciprocated the shaft is caused to move longitudinally therewith. The piston 5 is provided with an appropriate head operating in a cylinder 6, there being a spring 7 in front of the piston-head to return the same to its home position. A pipe 8 leads into the rear end of the cylinder, said pipe being controlled by a three-way valve 9, whereby pressure, preferably in the form of compressed air, may be admitted to and exhausted from the rear end of the cylinder.

Shaft 3, as shown in Figs. 3 and 4, is provided with a keyway in which operates a key for locking a sliding clutch member 10, arranged on the shaft between the bearings 2, against independent rotation. This clutch member is provided with an annular groove in which fit projections extending from the yoke or ring of an operating-handle 11, pivotally mounted on a link 12, fulcrumed on a bracket extending from the bed-plate. A spring 13 tends to pull the handle 11 rearwardly and in so doing disengages the clutch-face thereof from the driving-pulley. The clutch member 10 is provided with a lug 14, designed to coöperate with a notch in the inner face of the rear bearing 2, so that when said lug is in said recess the shaft 3 will occupy a predetermined position.

15 indicates a pulley whose hub is formed with a friction-face coöperating with the clutch member, said pulley being mounted on the forward bearing 2 and loosely mounted upon the shaft 3. The forward end of shaft 3 is preferably threaded, as shown in Figs. 3 and 4, for the attachment of a combined die and mandrel member 16. The forward end of this member forms a mandrel having a slot in its periphery into which the bent end of the blank is inserted preparatory to forming a spring. The die portion of this member 16 consists of a series of helically-arranged shoulders corresponding in width to the thickness of the blank and of a pitch equal to that of the intermediate convolutions of the spring, the end convolutions merging into faces having parallel planes.

The blank 17, from which the spring is to be formed, is provided with a bent end portion 18, designed to fit in the slot in the mandrel, and in operation this blank is preferably heated before it is placed in position to be operated upon by the machine.

A lever 19, having a roller at its inner end, preferably under the mandrel, is connected to a treadle 20, whereby when the blank is inserted in position the operator by placing his foot on the treadle forces the roller at the end of lever 19 up against the blank and causes the blank to hug the mandrel in the initial operation of forming the spring. A weight 21 serves to withdraw the lever 19 and its roller from the mandrel when the spring is initially formed. In operation the operator locks the end of the blank to the mandrel, depresses the treadle 20, and throws the clutch member into engagement with the driving-pulley, so as to rotate the mandrel. The blank is drawn around the mandrel and forms a spiral spring, such as shown in Fig. 5. The operator now releases the treadle 20 and also the handle 11, the spring 13 retracting the clutch member and forcing the lug 14 into the recess in the face of the rear bearing, so as to stop the mandrel and its spring at a predetermined point. If, however, the lug 14 is not located in the recess when the parts come to a position of rest, the operator by manipulating the hand-wheel 4 rotates the shaft a sufficient distance to place the lug in the recess. When this is done, the valve 9 is operated so as to admit pressure behind the piston, and the shaft 3 is moved forwardly, as shown in Fig. 4, into a female die having helical shoulders corresponding to the shape that the spring shall have when finished. The metal being heated will readily partake of the shape given to it when the mandrel is forced into the female die and become set, so that when the valve 9 is manipulated to exhaust the pressure from behind the piston the spring 7 will retract the shaft 3 and with it the finished spring. It is only necessary now to remove the finished spring from the mandrel and temper it in oil or any appropriate manner. The shape of the finished spring is shown in Fig. 6. The female die 22, with its helical shoulders above referred to, is preferably carried by an integral part 23 of the bed-plate.

In some instances it may be desired to form a spring without the locking portion 18, and in Figs. 7 and 8 I have shown a construction in which 24 indicates a tool having an appropriate handle at one end and at whose opposite end is an angular projection 25. The blank is provided with an opening 26, which is designed to engage the end 25, which projects through the slot in the mandrel. By the use of this construction the same operations are gone through in forming the spring, except that the operator introduces the tool through the female die and into the mandrel, releasing the tool when the blank is in engagement therewith. As the initially-wound blank is forced into the female die the tool is of course moved with it, and when the male die is retracted the tool may be grasped by the operator to hold the spring in the female die, the tool being then used to eject the finished spring, after which the tool may be inserted in the retracted mandrel ready for another operation.

Having thus described the invention, what is claimed as new, and desired to be secured by Letters Patent, is—

1. In a machine of the character described, the combination with a rotatable mandrel for initially winding the blank, of a forming-die in axial alinement with said mandrel, and means for moving the mandrel longitudinally so as to shape the wound blank carried thereby; substantially as described.

2. In a machine of the character described, the combination with a rotatable mandrel, of means for locking the blank to the mandrel, a forming-die bearing a fixed relation to said mandrel and a female die in coöperative relation with the forming-die; substantially as described.

3. In a machine of the character described, the combination with a rotatable mandrel, of means for temporarily locking the blank to the mandrel, a male forming-die bearing a fixed relation to said mandrel, and a female forming-die in axial alinement with said mandrel; substantially as described.

4. In a machine of the character described, the combination with a rotatable mandrel, of means for temporarily locking the blank to the mandrel, a male forming-die bearing a fixed relation to said mandrel, a female forming-die in axial alinement with said mandrel, and means for moving the mandrel longitudinally into said female die; substantially as described.

5. In a machine of the character described, the combination with a rotatable mandrel, of means for temporarily securing the blank thereto, a device for pressing the blank against the mandrel, whereby said blank may be wound in spiral form, a male die having a helical shoulder starting from the mandrel, and a female die having a corresponding helical shoulder, said female die being in axial alinement with the mandrel; substantially as described.

6. In a machine of the character described, the combination with the winding-mandrel and forming-dies, of means for rotating one of said dies and mandrel, means for moving said rotatable die and mandrel in a longitudinal direction, and means for fixing said rotatable die and mandrel in a predetermined position previous to said longitudinal movement; substantially as described.

7. In a machine of the character described, the combination with suitable bearings, of a shaft mounted therein, a driving-pulley loosely mounted on said shaft, said driving-pulley being provided with a clutch-face, a sliding clutch member mounted on the shaft, and means on one of the bearings for coöperating with the sliding clutch member for bringing the shaft to a predetermined position of rest; substantially as described.

8. In a machine of the character described, the combination with suitable bearings, of a shaft mounted therein, a driving-pulley loosely mounted on said shaft, said pulley being provided with a clutch-face, a clutch member slidingly mounted on the shaft, a projection on said clutch member for coöperating with the recess in one of said bearings, a lever for moving the clutch member into engagement with the pulley, and a spring for retracting said clutch member; substantially as described.

9. In a machine of the character described, the combination with suitable bearings, of a shaft mounted therein, a driving-pulley loosely mounted on said shaft, said pulley being provided with a clutch-face, a clutch member slidingly mounted on the shaft, a projection on said clutch member for coöperating with the recess in one of said bearings, a lever for moving the clutch member into engagement with the pulley, a spring for retracting said clutch member, and a hand-wheel on the shaft for rotating the same manually to locate the projection on the clutch member in the recess of the bearing; substantially as described.

10. In a machine of the character described, the combination with a rotatable shaft, of a mandrel and die carried by said shaft, a fluid-actuated piston connected to said shaft and a female die in coöperative relation with the die on said shaft; substantially as described.

11. In a machine of the character described, the combination with a rotatable shaft, of a mandrel and die carried by said shaft, a female die in axial alinement with said shaft, means for bringing the shaft to a predetermined position of rest, and a fluid-actuated piston connected to the shaft for moving the same longitudinally; substantially as described.

12. In a machine of the character described, the combination with a shaft carrying a winding-mandrel and forming-die at one end, of a female die in coöperative relation with the forming-die, a fluid-actuated piston connected to the opposite end of the shaft, and a spring for returning said piston and shaft to normal position; substantially as described.

13. In a machine of the character described, the combination with a shaft, of a winding-mandrel and forming-die at one end thereof, a female die in axial alinement with said shaft, means for bringing the mandrel and die carried by the shaft into a predetermined position of rest, a cylinder whose piston is connected to said shaft, a valve for admitting and exhausting pressure to and from behind said piston, and a spring for returning said piston and its connected parts to normal position; substantially as described.

14. In a machine of the character described, the combination with a slotted mandrel, of a tool having a bent end fitting in the slot of said mandrel and projecting beyond the periphery thereof, the projecting end of said tool coöperating with the blank to be operated upon; substantially as described.

15. In a machine of the character described, the combination with a slotted mandrel, of a removable tool having a bent end fitting in the slot of said mandrel and projecting beyond the periphery thereof, the projecting end of said tool coöperating with the blank to be operated upon; substantially as described.

In testimony whereof I hereunto affix my signature, in the presence of two witnesses, this 3d day of March, 1905.

FRANCIS M. STAMBAUGH.

Witnesses:
    EDWARD WILSON,
    GEORGE BAKEWELL.